United States Patent Office 3,048,331
Patented Aug. 7, 1962

3,048,331
OPTIMIZING APPARATUS AND METHOD
Robert I. Van Nice, Glenshaw, and William G. Evans, Monroeville, Pa., assignors to Westinghouse Electric Corporation, East Pittsburgh, Pa., a corporation of Pennsylvania
Filed Jan. 29, 1959, Ser. No. 789,922
2 Claims. (Cl. 235—151)

This invention relates to the automation art and has particular relation to the optimizing of industrial processes and the operation of industrial systems. This application relates to and incorporates by reference an application Serial No. 730,590, filed April 24, 1958, to Albert Kerstukos et al., and assigned to Westinghouse Electric Corporation (hereinafter called Kerstukos application).

The Kerstukos application relates to apparatus and a method for optimizing in the use and practice of which the product output of the system under control is optimized. While the Kerstukos invention has been found to operate highly successfully, there are situations in which other factors of the system or process are to be optimized rather than the output. One such factor is the output in terms of the input, for example, the product output per pound, cubic foot or other unit, or units, of the input of one or more of the products. For example, in the situation illustrated in the Kerstukos application, the factor to be optimized may be the quantity of monostyrene per cubic foot of ethyl-benzene or, if the steam is to be taken into consideration the factor to be optimized may be given by the equation $$F = \frac{Q}{aE + bS}$$

where Q is the quantity of monostyrene per unit time, E the input of ethyl-benzene per unit time, S the input of steam per unit time and $a$ and $b$ are weighting factors.

Another such factor which is a typical and important performance criterion of a process is operating profit rate. An equation for this quantity can often be set up in terms of known and measurable quantities. The costs of the materials and energy being fed to the process are subtracted from the value of the product.

Another factor arises when the production rate of the process is to be adjustable, so it can be set at a level determined by marketing considerations; then the operating costs of the process are to be minimized.

It is then an object of this invention to provide a method and apparatus for optimizing a factor of the operation of a system which is a function of the product output of the system.

A more specific object of this invention is to provide a method and apparatus for optimizing a factor of the operation of a system such as product output per unit of component input, operating profit rate, or production in terms of marketing considerations.

In accordance with this invention, optimizing apparatus is provided which includes a computer between the output of the controlled system which delivers the signal dependent on product output and the output converter of the optimizing apparatus. The computer computes the factor to be optimized and delivers a second signal dependent on this factor to the output converter. The latter responding to this second signal injects data into the optimizing apparatus, and the optimizing apparatus sets the variables of the controlled system so as to optimize the factor rather than the product output.

The computer includes means for injecting other parameters in addition to the signal proportional to product output. For example, it may include potentiometers which are set to correspond to the settings of the input components and which are connected to the product signal so as to perform the necessary division operations. The computer may also include dials for setting the parameters from which a factor such as profit is calculated. Where a process is to be set in accordance with marketing considerations, the computer provides a signal which for the given production rate (set on one dial of the computer) is the actual operating costs; for production rates either higher or lower than called for, the signal is the operating costs plus a penalty term which increases rapidly as the production rate deviates from the desired value. The optimizing control, seeking a minimum value of this composite signal from the computer, will quickly find the "valley" representing actual operating costs, and then seek the lowest point in the valley.

The novel features considered characteristic of this invention are discussed generally above. The invention itself both as to its method of operation and as to its organization, together with the objects and advantages thereof will be understood from the following description of a specific embodiment taken in connection with the accompanying drawing, in which:

FIG. 2 is similar to FIG. 1 of the Kerstukos application. To facilitate understanding, the labeling of the Kerstukos application is followed, where feasible, in FIG. 2.

Figure 1:
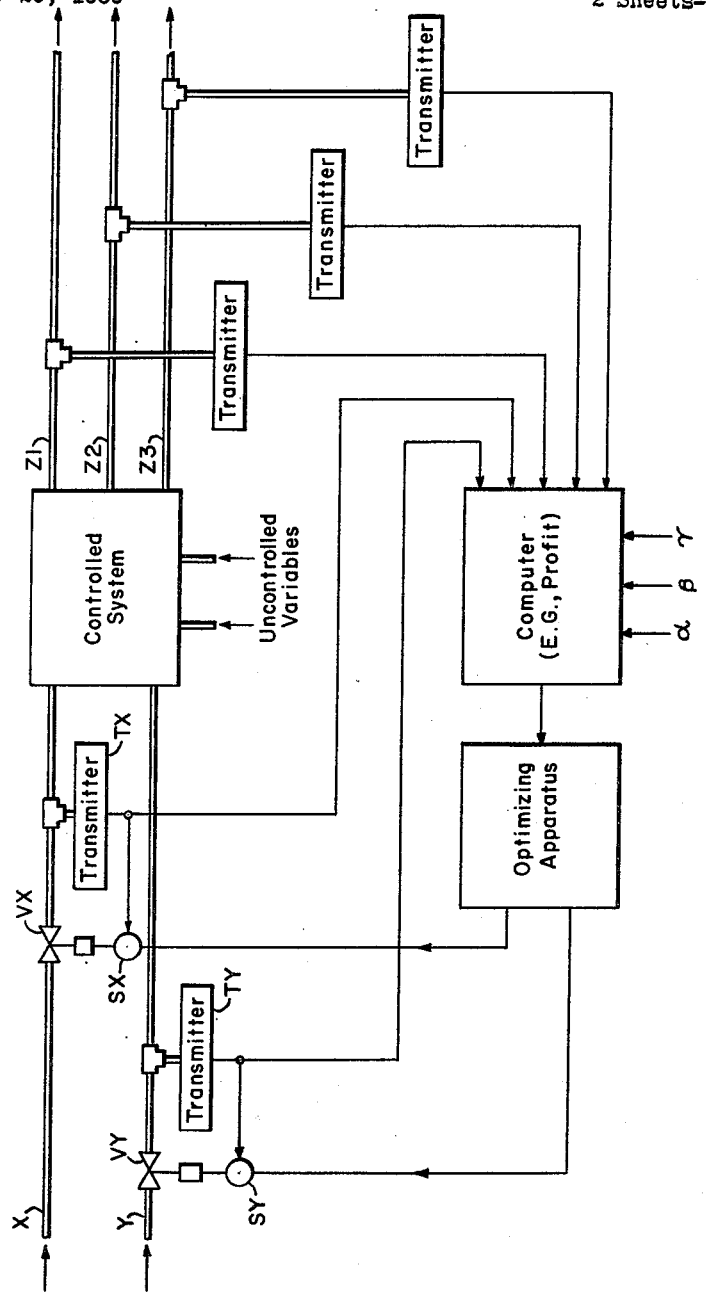
FIG. 1 is a block diagram showing the important features of an embodiment of this invention.

The apparatus shown in FIG. 1 includes a Controlled System which produces a product and the output of which is to be controlled so that a factor which is a function of the output is optimized. This output is varied by setting variables or parameters X and Y. The variables are impressed respectively through the conductors labeled X and Y. Where the variables are fluids like ethyl-benzene or steam, the setting is effected by valves VX and VY. The valves may be actuable by solenoids SX and SY.

The Controlled System delivers signals Z1, Z2, Z3 corresponding to properties of the product output of the system. Where only one property such as quantity is involved, only one of these signals will be transmitted. The signals Z1, Z2, Z3 are injected into a Computer which converts the signals Z1, Z2, Z3 into the factor to be optimized. The Computer includes controls $\alpha$, $\beta$, $\gamma$, for injecting other parameters involved in the computation of the factor optimized. The Computer is also connected to transmitters TX and TY which may inject data on the setting of the valves SX and SY where the quantity of the variables X and Y is involved in the computation of the factor.

The form of the data to be injected may be derived from an equation for the factor. For example, where the factor is profit on a product produced by reacting two fluids, the following equation may apply.

$$P = V_B X_{BP} W_P - V_A W_{AF} - V_S W_{SF}$$

where $P$ = profit in dollars per hour
$V_A$ = cost in dollars per mol of one input component
$V_S$ = cost in dollars per mol of the other input component
$V_B$ = selling price in dollars per mol of the product delivered
$X_{BP}$ = mol fraction of desired product in the output
$W_P$ = rate of flow of product delivered in mols per hour
$W_{AF}$ = rate of flow of first-named input component in mols per hour
$W_{SF}$ = rate of flow of second-named input component in mols per hour In applying this equation $V_A$, $V_S$, $V_B$ are set on dials $\alpha$, $\beta$, $\gamma$; $X_{BP}$ and $W_P$ are delivered from terminals Z1 and Z2, $W_{AF}$ is derived from TX and $W_{SF}$ from TY.

The Computer is connected to control the Optimizing Apparatus so that the polarities and magnitudes of $\Delta X$ and $\Delta Y$ are set to optimize the factor computed by the Computer (for example, P in the above equation). The solenoids SX and SY are controlled from Optimizing Apparatus which operates to set the variable X and Y as described in the Kerstukos application.

Figure 2:
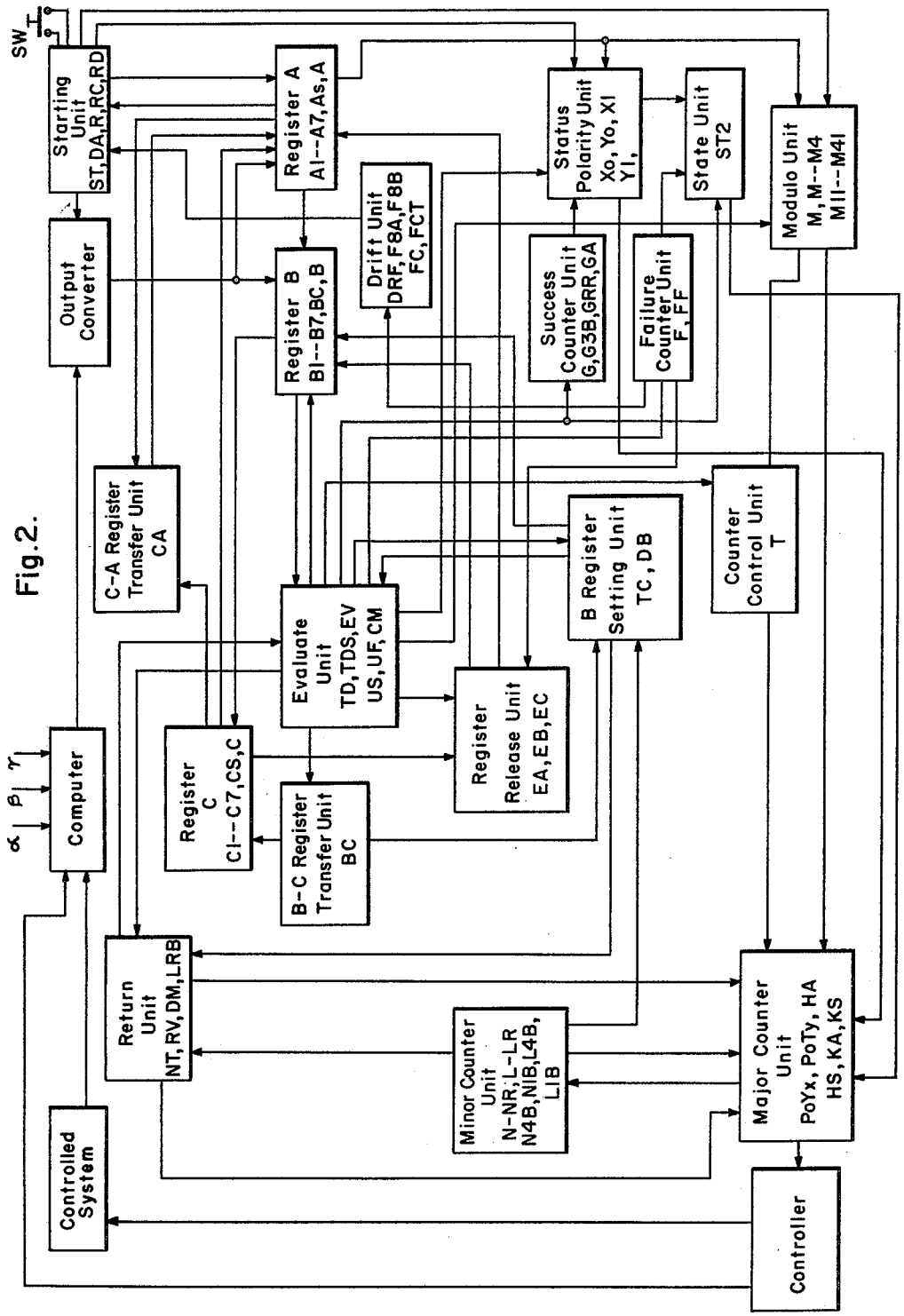
FIG. 2 is a block diagram showing these features in detail.

In the block diagram shown in FIGS. 2, the system which is to be optimized is labeled Controlled System, as in FIG. 1. The increments $\Delta X$ and $\Delta Y$ are added to the parameters X and Y of the Controlled System by a controller which is electrically controlled from the Major Counter Unit through a pair of potentiometers POTX and POTY, respectively. A quantity proportional to the operation of the Controlled System is derived from the controlled system through an Output Converter which is supplied from the Computer.

The apparatus in accordance with this invention includes additionally to the Major Counter Unit a Minor Counter Unit, the counters of which are so interconnected with the counters of the Major Unit as to count out increments of the proper length. The apparatus also includes a Counter Control Unit which causes operation of the Counter Unit under the proper circumstances.

The apparatus includes a Starting Unit for starting an optimizing operation. The Starting Unit is actuable by instantaneous closing of a push button SW and the optimizing operation continues automatically once this button is released and permitted to reopen. The Starting Unit is connected to the Output Converter and when actuated conditions the Output Converter to transmit a magnitude proportional to the operation of the Controlled System.

The apparatus further includes Registers A, B and C in which are recorded the magnitudes of the factor (e.g., profit P) involved in the operation of the System as binary numbers. Registers A and B are adapted to be connected to the Output Converter through a plurality of selectively operable contacts corresponding in number to the relays of the Registers. These contacts are set by the Output Converter to define as a binary number the magnitude at any time of the factor of the operation of the Controlled System being optimized. At the start of the operation, the initial setting of the Computer is recorded in Register A following actuation of the Starting Unit. The apparatus includes a Status Polarity Unit and Modulo Unit which are interconnected with Register A so that once the mognitude is recorded in Register A, the Modulo Unit is set to correspond to the first move modulo ($\Delta X$ and $\Delta Y$) of the pattern. The Modulo Unit is interconnected with the Counter Control Unit and the Major Counter Unit so that on being set, the Modulo Unit causes the Major Counter Unit to be actuated to introduce the first move into the Controlled System.

The apparatus also includes a B-Register Setting Unit. This Unit is interconnected with the Major and Minor Counter Units and with Register B so that once the first move is completed, a magnitude corresponding to the factor to be optimized of the operation of the Controlled System at the new setting is recorded in Register B. The connection is through a timer which times out only after a sufficient interval elapses to enable the Controlled System to Stabilize so that the magnitude of the factor of its operation is reasonably approximate to the final magnitude of operation which would be attained in the new setting. If the trend of the operation of the Controlled System and the Computer is non-oscillatory towards an increase or a decrease, it is not necessary that the system reach its final operation following the first or any later move before the operation is recorded in Register B. It is only necessary that the record in Register B clearly show whether an increase or a decrease has occurred. Where the System is non-oscillatory, this will be manifested after a relatively short time interval.

Once the recording in Register B is completed, the magnitude in Register A and the magnitude in Register B are compared by an Evaluate Unit which is actuated when the record in Register B is complete. The Evaluate Unit has two responses, one for the case in which the record in Register B is higher than the record in Register A, and the other when the records are equal or when B is lower than A. When the record in Register B is higher than in Register A, the move is a success. Otherwise, the move is a failure.

The apparatus includes a B-C Register Transfer Unit which is actuable by the Evaluate Unit in the case of a success. This Unit causes the record in Register B to be transferred to Register C. The record is Register A is then removed and the record in Register C is transferred to Register A by a C-A Register Transfer Unit. The new record represents operation of a higher magnitude of the Controlled System than the record removed. When the record in Register A is removed, the Modulo Unit is actuated and sets a new modulo in the pattern. Once the transfer from Register C to Register A is effected, the record in Register C is removed. With this removal, a successful move is completed. The Major Counter Control Unit is then again actuated to introduce another increment into the parameters of the Controlled System.

In the event of a failure the Evaluate Unit operates through the Register Release Unit to remove the record from Register B and then through the Return Unit to return the Major Counter Unit and POTZ and POTY to their settings before the move. In addition, the Status Polarity Unit is actuated to change polarity or status and the State Unit is actuated under certain circumstances to change state. The apparatus also includes a Return Unit. The Return Unit is actuated by the Evaluate Unit in the event of a failure and actuates the Major Counter Unit to return the Controlled System to the setting which this System had prior to a move which failed.

The apparatus further includes a Success Counter Unit and a Failure Counter Unit. The Success Counter Unit operates only with the apparatus in state 2, and resets the apparatus to state 1 and the increments to a lower status than 2 on the occurrence of a predetermined number of successes. The Failure Counter Unit operates to count failures and to control the state and the operation of the apparatus at and near the optimum point of the system.

The apparatus disclosed in FIG. 2 operates to optimize the factor computed by the Computer and thus economic operation is achieved.

While a preferred embodiment of this invention has been disclosed herein, many modifications thereof are feasible. This invention then is not to be restricted except insofar as is necessitated by the spirit of the prior art.

We claim as our invention:

1. Apparatus for optimizing a predetermined factor of the operation of a system which produces a product by processing material, the output of said product varying as an unknown function of a plurality of variable quantitative parameters each of which constitutes a magnitude of a property of said product, of said material or of said processing, each variable parameter being settable over a predetermined range, said factor being a function of said output and other parameters, the said apparatus comprising means to be connected to said system for changing the setting of said variable parameters during successive moves by predetermined increments, each said move being capable of producing an improvement or no improvement of said factor, means connected to said changing means and to be connected to said system for deriving from said system during each of said moves a first signal dependent on said output following said last-named move, a computer connected to said deriving means responsive to said first signal for computing said factor in terms of said output and said other parameters and for producing a second signal dependent on said factor, memory means connected to said changing means and to said computer for retaining any signals dependent on said factor produced by any move in the succession of moves which produces an improvement in said factor and for rejecting all said signals dependent on said factor produced by moves which do not produce an improvement in said factor, and means connected to said changing means and to said memory means for setting the polarity of said increments responsive to the success or failure of a move so as to optimize said factor.

2. The method of optimizing a predetermined factor of the operation of a system which produces a product by processing material, the output of said product varying as a function of a plurality of variable quantitative parameters each of which constitutes a magnitude of a property of said product of said material or of said processing, each variable parameter being settable over a predetermined range, said factor being a function of said output and of other parameters, the said method comprising during a successive number of moves changing said variable parameters by predetermined increments in accordance with a predetermined pattern, each said move being capable of producing an improvement or no improvement in said factor after each move measuring said output, computing said factor from said last-named output and said other parameters, comparing said last-named factor with the optimum factor achieved during prior moves, replacing said optimum factor achieved during previous moves with said last-named factor if said last-named factor is an improvement over said last-named optimum factor and rejecting said last-named factor if said last-named factor is no improvement over said last-named optimum factor, and in dependence on said comparison adjusting said increments during the moves following each move so as to optimize said factor.

References Cited in the file of this patent

UNITED STATES PATENTS

| | | |
|---|---|---|
| 2,628,606 | Draper et al. | Feb. 17, 1953 |
| 2,712,414 | Ziebolz et al. | July 5, 1955 |
| 2,829,322 | Silva | Apr. 1, 1958 |
| 2,842,311 | Petrie | July 8, 1958 |
| 2,972,446 | White | Feb. 21, 1961 |
| 2,972,447 | White | Feb. 21, 1961 |

OTHER REFERENCES

"Optomalizing System for Process Control," by Y. T. Li, from "Instruments and Automation," pp. 72–77, 190–193, 228, 324–327 and 350–352, vol. 25, January, February and March 1952.

"The Quarie Optimal Controller," by Byron White from "Instruments and Automation," pp. 2212–2216, vol. 29, November 1956.